US005667397A

United States Patent [19]
Broschard, III et al.

[11] Patent Number: 5,667,397
[45] Date of Patent: Sep. 16, 1997

[54] SMART CARD CONNECTOR

[75] Inventors: John L. Broschard, III, Hershey; David S. Slupe, Camp Hill, both of Pa.

[73] Assignee: The Whitaker Corporation, Wilmington, Del.

[21] Appl. No.: 348,015

[22] Filed: Dec. 1, 1994

[51] Int. Cl.⁶ .................................................. H01R 29/00
[52] U.S. Cl. ................................................ 439/188; 439/489
[58] Field of Search .................................... 439/188, 489, 439/629–637; 200/51.1

[56] References Cited

U.S. PATENT DOCUMENTS

| | | | |
|---|---|---|---|
| 4,393,283 | 7/1983 | Masuda . | |
| 4,795,354 | 1/1989 | Owen | 439/137 |
| 4,826,445 | 5/1989 | Verhoeven et al. | 439/267 |
| 4,887,188 | 12/1989 | Yoshida et al. | 361/413 |
| 4,900,272 | 2/1990 | Lange et al. | 439/630 |
| 4,900,273 | 2/1990 | Pernet | 439/630 |
| 5,013,255 | 5/1991 | Juret et al. | 439/260 |
| 5,030,124 | 7/1991 | Lorentzon . | |
| 5,033,972 | 7/1991 | Komatsu et al. | 439/153 |
| 5,051,566 | 9/1991 | Pernet | 439/267 |
| 5,321,247 | 6/1994 | Mroczkowski et al. | 235/492 |
| 5,330,363 | 7/1994 | Gardner et al. | 439/188 |
| 5,334,034 | 8/1994 | Reichardt et al. | 439/188 |
| 5,334,827 | 8/1994 | Bleier et al. | 235/492 |
| 5,336,984 | 8/1994 | Mischenko et al. | 320/2 |
| 5,470,243 | 11/1995 | Bendorf | 439/188 |

*Primary Examiner*—Hien Vu

[57] ABSTRACT

A smart card connector with a card slot (10) for receiving a smart card employs an end position switch comprising a single resilient contact (14) engaging a stationary post (16) to detect full insertion of a smart card. Self cleaning wiping mating contact is generated when the resilient contact (14) engages the stationary rigid post (16). The resilient contact (14) and the post (16) are mounted in the rear of a housing base (4) which includes resilient data contacts (12). The housing base (4) also includes resilient cantilever diverter springs (18), molded into the housing base which both protect the data contacts (12) and provide a reactive force to counter the force exerted by the normally closed resilient contact (14) upon full insertion of the smart card.

12 Claims, 9 Drawing Sheets

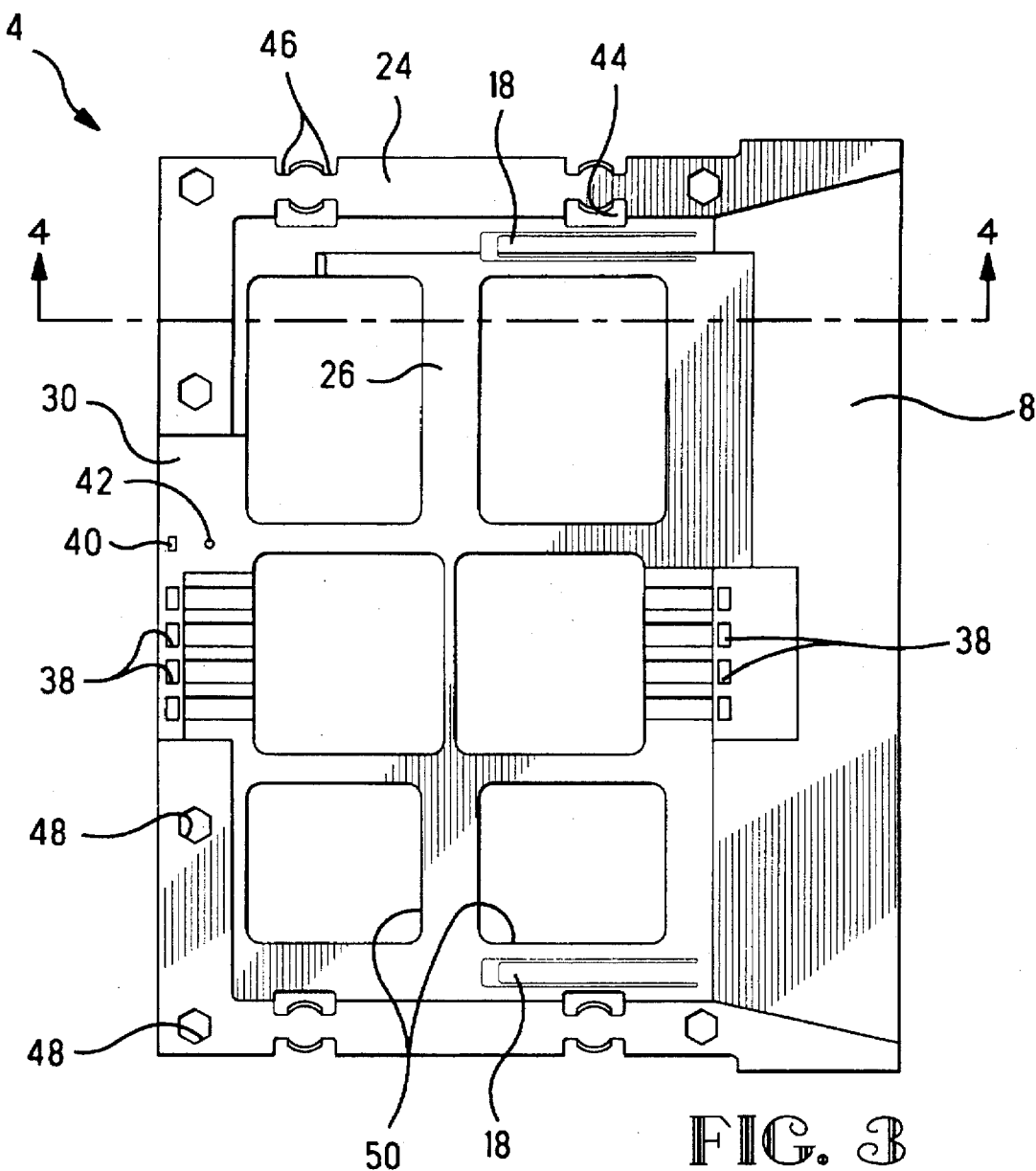
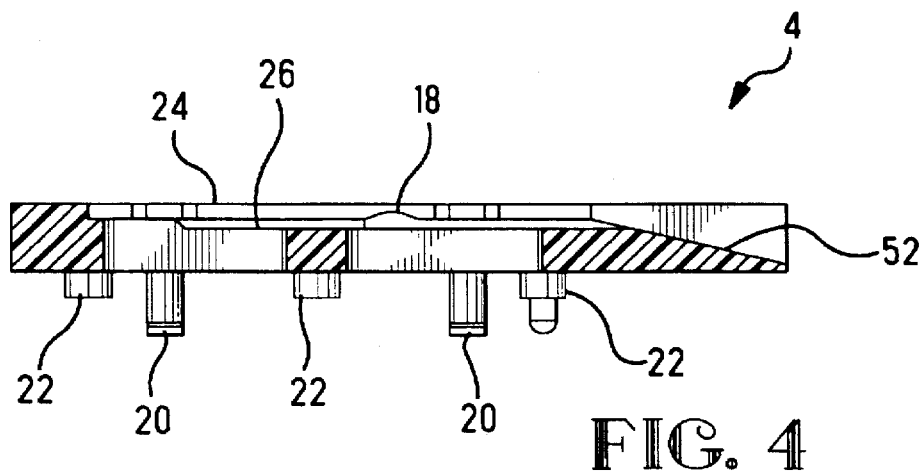

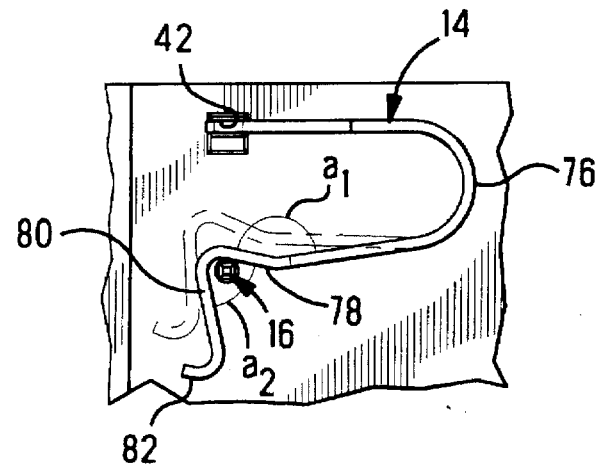
FIG. 15
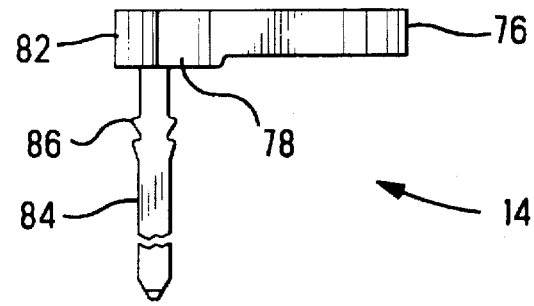
FIG. 16
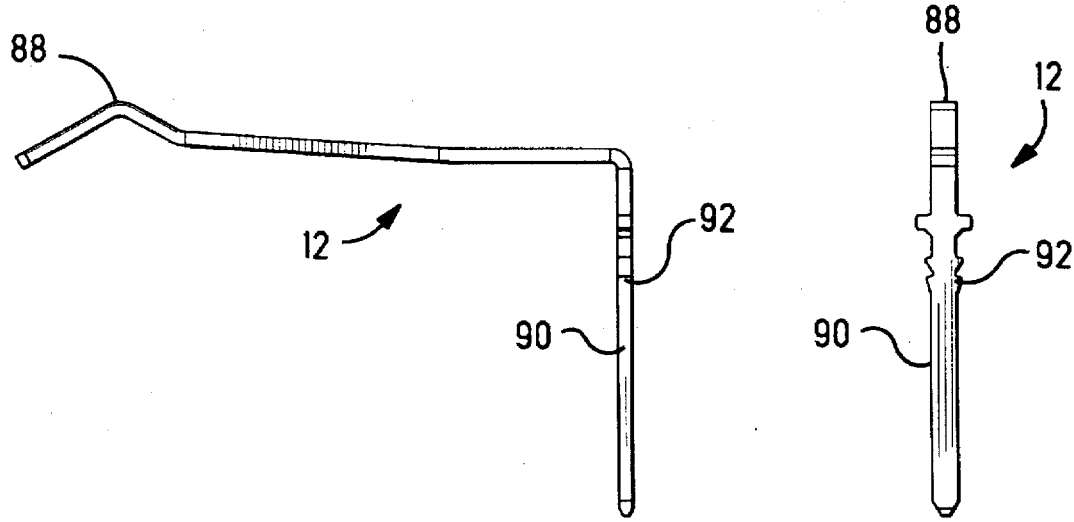
FIG. 17
FIG. 18

SMART CARD CONNECTOR

FIELD OF THE INVENTION

This invention relates to apparatus for use with smart cards, or chip cards, which contain memory or other intelligence on the card, and more specifically to devices, such as card readers, for interfacing with cards of this type. More specifically this invention relates to connectors for use with such smart cards, the connectors being a component of the smart card reader or other smart card interface device. Still more specifically this invention relates to smart card connectors which employ an end position or end of stroke switch to detect full insertion of a smart card.

BACKGROUND OF THE INVENTION

A smart card or chip card as presently used consists of a card of approximately the same size as a standard credit card that contains intelligence on the card itself. This intelligence is typically in the form of a memory circuit which can contain read only memory or read/write memory (random access memory) contained on the card. The information stored in the card's memory can then be used by the card reader or card interface device to detect certain information stored on the card, such as an instantaneous bank balance. The information stored in the card's memory can also be instantaneously updated, for example the alteration of the security status of a specific badge holder. Cards of this type can also be used with cable television decoders or descramblers and with satellite systems.

Although the preferred embodiments of this invention are specifically directed to smart cards, it is equally applicable to connectors or similar devices. For example this invention would be applicable to the use of connectors for smart keys and could even be used for memory cards of the type generally referred to as PCMCIA cards.

Card readers or connectors for use with smart cards typically employ data contacts to engage pads on the cards themselves. These card readers or connectors generally employ an end position or end of stroke switch to detect full insertion of the card into the connector. These end position switches can be either normally closed switches which are opened when the smart card is fully inserted or normally open switches which are closed by insertion of the card. When the state of the switch is detected, the card reader or interface device is activated and data is transmitted to or from the smart card.

Among the problems which must be overcome for card connectors and card readers of this type to attain a satisfactory level of performance is that the connectors must function for a large number of card insertions, and the card connector must function in environments which can cause deterioration or damage to the contact interface of the data contacts and the end position switches. Typically the card connectors will be used in applications, such as in automatic teller machines or in security devices, where a large number of cards will be used with a single card connector or reader. Over time the cards used in these applications can become deformed and can collect foreign substances which can interfere with the operation of the card reader. The card connectors can also be used in environments, such as outdoor use in automatic teller machines, where they are susceptible to environment contaminants, or in which oxides could build up over time. Since these applications employ relatively low electrical potential and current, the energy present in power applications to burn off these contaminants or oxides is not available. Therefore it is desirable that a wiping contact between the data contacts and the card contact pads be established to insure removal of contamination from the contact area. This wiping contact, however, must not be accompanied with excessive force which might damage the plating on the data contacts or the resilient data contacts themselves. Similarly, a wiping contact action is desirable on the end position switch contacts for the same reasons.

One method of employing a wiping contact for the end position switches is to use to resilient switch contact elements which undergo relative and absolute motion during mating contact. U.S. Pat. No. 4,900,273, U.S. Pat. No. 5,013,255, and U.S. Pat. No. 5,334,034 each disclose smart card readers or connectors which employ end of stroke switch contacts using two resilient blades or beams to impart a wiping or self cleaning action during mating engagement. One problem which each of these devices embody is that two resilient end position switch contacts invariably occupy more space than one resilient beam. Therefore the card connectors in which they are used tend to be somewhat larger than would otherwise be necessary. In many, and perhaps most, applications space is critical, especially the printed circuit board space which is occupied by the card connector. For example, a larger card connector might dictate the use of a double sided printed circuit board instead of a single sided printed circuit board with the added cost inherent in the double sided board.

SUMMARY OF THE INVENTION

A connector for use with a smart card containing electronic intelligence on the card, such as memory storage on the smart card, is mounted on a printed circuit board so that the smart card can be connected to the interface circuitry in the device with which the smart card is to communicate. The smart card connector comprises a plurality of data contacts mounted in a housing. The housing has a card slot into which the smart card is inserted and the data contacts extend into card slot to make contact with interface pads on a fully inserted smart card.

The connector includes an end position or end of stroke switch that is activated by the smart card upon full insertion into the card slot. In the preferred embodiment, this end position switch is a normally closed switch, although a normally open switch using the same basic invention could be employed in the smart connector. The end position switch comprises a switch spring and a switch post, both of which are mounted in the base of the connector housing at the rear of the card slot. The switch spring includes a section adjacent the end which extends into the card slot when the switch is in its normally closed position. The card engages the end of the switch spring and deflects the spring rearwardly out of engagement with the switch post thus indicating that the card has been fully inserted into the card slot.

The switch spring also includes a wiping section which engages the surface of the switch post during engagement. This wiping section slides relative to the post during engagement to form a wiping action. This wiping action tends to remove contaminants and oxides and to maintain a good electrical connection. In the preferred embodiment, this wiping section comprises a section which is inclined relative to the direction in which the deflectable spring moves. This wiping section is located on the end of a generally U-shaped deflectable section and is also located between the deflectable section and that portion of the switch spring which extends into the card slot. In the preferred embodiment, the switch spring, the switch post and half of the data contacts are mounted side by side in a channel at the rear of the housing base. This configuration efficiently uses the available space and minimizes the amount of printed circuit board real estate which is occupied by the smart card connector.

BRIEF DESCRIPTION OF THE DRAWINGS

FIG. 3 is a top plan view of the smart connector housing base.

FIG. 4 is a side section view of the housing base taken along section line 4—4 in FIG. 3 of the smart connector base showing the front shroud or scoop and the mounting posts.

FIG. 15 is a top plan view of the spring and post which form the end position switch showing the normally closed position of the switch, with the deflected or open position of the switch spring shown in phantom.

FIG. 16 is a side view of the switch spring shown in FIG. 15.

FIG. 17 is a side view of a data contact used in the smart connector.

FIG. 18 is a view of a data contact showing the anchoring leg of the data contact.

DETAILED DESCRIPTION OF THE PREFERRED EMBODIMENTS

Figure 1:
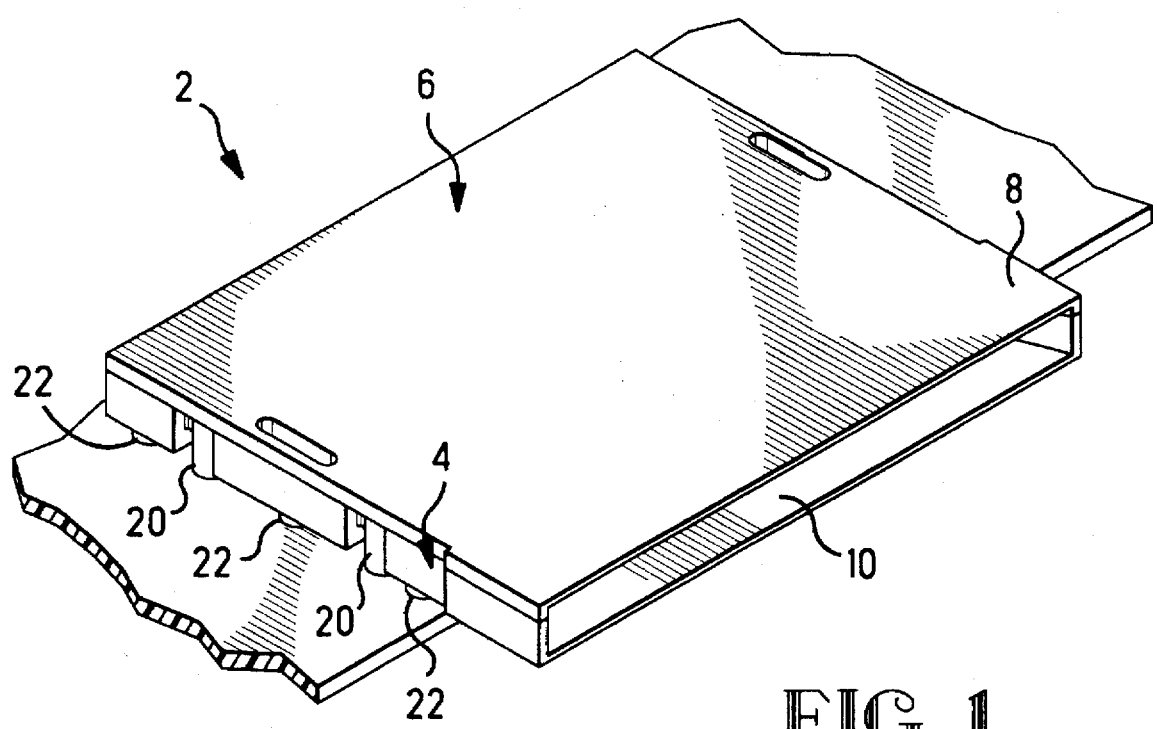
FIG. 1 is a perspective view of a representative embodiment of a smart card connector mounted on a printed circuit board.

The smart card connector 2 shown in FIG. 1 is intended to be mounted in a printed circuit board and to provide the interface in which a smart card can be inserted so that data can be read from or written into the smart card by the smart card interface circuitry. The embodiment shown in FIG. 1 includes a housing base 4 and housing cover 6, both of which have a scoop or card entry shroud 8 at the front of the housing. The base 4 and cover 6 form a card slot 10 which extends from the front of the housing through the shroud or scoop 8 to the rear of the smart card connector 2.

The housing base 4 and the housing cover 6 are each injection molded from a conventional thermoplastic material. In the preferred embodiment of this invention, these housing components are molded from a PCT plastic such as Ektar, a plastic supplied by Kodak.

FIG. 1 also shows mounting posts 20 extending from the bottom of the housing base 4 to secure the smart connector to a printed circuit board. FIG. 1 also shows standoffs 22 which position the smart connector above the printed circuit board to allow for proper installation and cleaning of the solder contacts on the printed circuit board.

Figure 2:
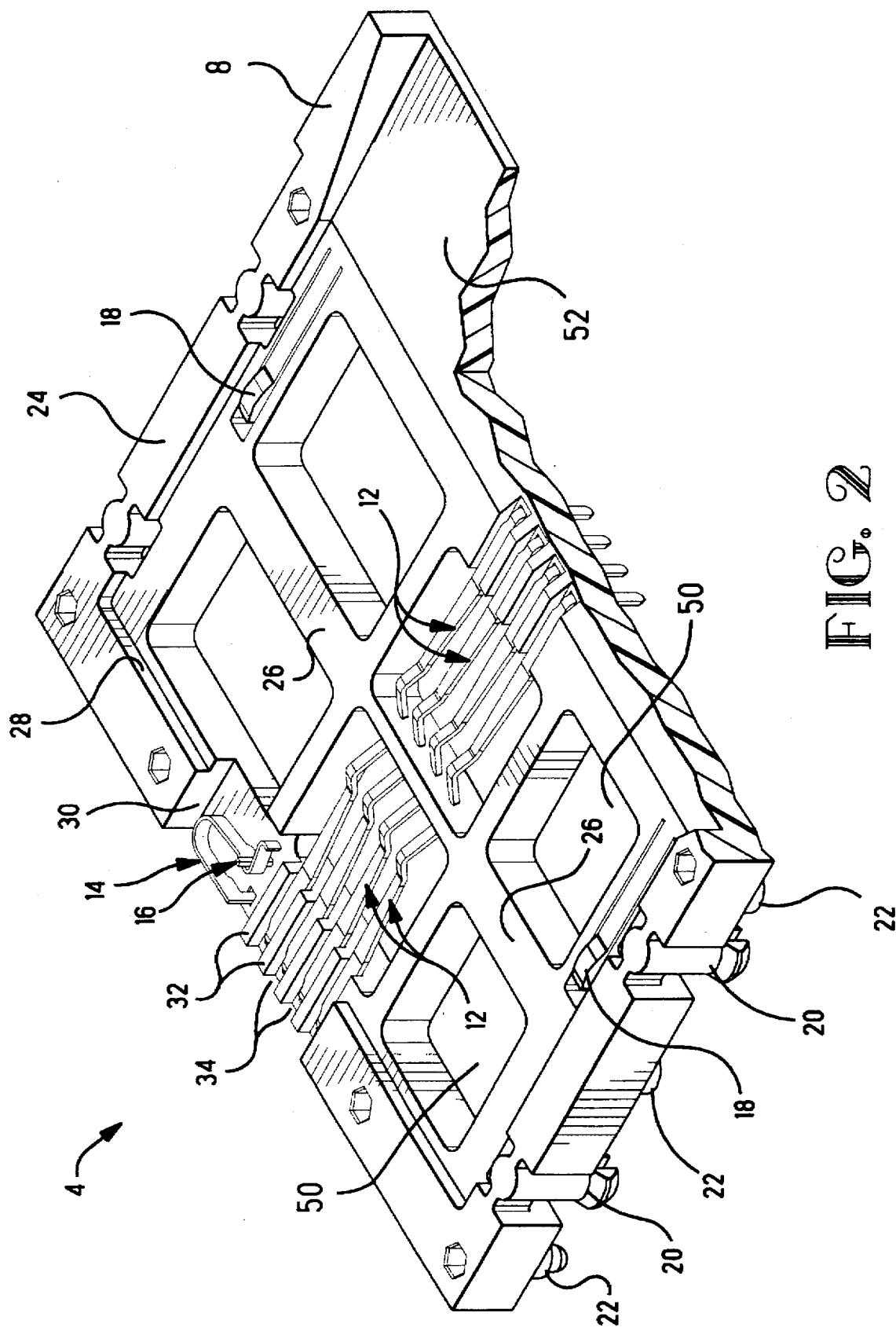
FIG. 2 is a perspective view of the smart connector housing base showing the position of data contacts, an end position switch and mounting posts for positioning the smart connector on a printed circuit board.

The housing base 4 is also shown in FIG. 2 where the upper surface of the housing base is shown. The upper surface of the housing base 4 comprises the bottom of the card slot 10. In the embodiment shown in FIG. 2, eight data contacts 12 are mounted in the housing base 4 in position to engage contact pads on a smart card inserted into the card slot 10. In this embodiment, four data contacts 12 extend from the front of the housing base 4 and four other offset data contacts 12 extend from the rear of the housing base 4. The data contacts 12 are resilient and contact portions of the data contacts 12 extend above the upper surface of the housing base 4 where they will engage pads on a smart card. The smart connector 2 also includes a normally closed end position or end of stroke switch which is located at the rear of the card slot 10 and housing base 4. The end position switch is formed by a switch spring 14 and a switch post 16, both of which are anchored in the housing base 4. The switch spring 14 and the switch post 16 are positioned on one side of the four data contacts 12 which extend from the rear of the housing base 4. The housing base also includes two diverter springs 18 which are part of the molded housing base 4. These diverters 18 are located slightly in front of the contact points of the front data contacts 12 and one diverter 18 is located on either side of the array of data contacts 12.

The housing base 4 has a peripheral rim 24 which extends around the two sides and partially along the rear of the upper surface of the housing base 4. The top of rim 24 is above the interior upper surface 26 and the gap formed between the top of the rim 24 and the surface 26 forms the lower half of the housing slot 10 in the assembled smart card connector 2. A shoulder 28 extends between peripheral rim 24 and surface 26 adjacent the two sides of the back of the housing base 4. This shoulder 28 serves as a card stop when a smart card is fully inserted into the housing slot 10. A channel 30, the lower surface of which is recessed below surface 26, is located between side portions of the rim 24 along the rear of the housing base 4. The four rear data contacts 12, the switch spring 14 and the switch post 16 are anchored to the housing base 4 in the channel 30. Separation ribs 32 extend up from the bottom of channel 30 to form contact slots 34 in which individual data contacts 12 are located. Six generally square openings 50 extend through the surface 26 from its top to the bottom. The four openings 50 located along the sides of the housing base 4, adjacent to the rim 24 are formed to eliminate unneeded plastic and are optional. The two center openings 50 provide clearance for deflection of the data contacts 12 to flex when a smart card is inserted into the slot 10. The mounting posts 20 and the standoffs 22 are molded as part of the rim 24 and each extends from the lower surface or rim 24. The lower half of the shroud or scoop 8 is partially shown at the front of the housing base 4 in FIG. 2. This shroud is shown broken away to expose the other elements of the housing base 4 and components mounted in the housing base. The inclined surface 52 on the shroud or scoop 8 provides a lead in for insertion of a smart card into the housing slot 10.

Other details of the housing base 4 are shown in the top plan view of FIG. 3 and the side sectional view of FIG. 4. As previously discussed, the data contacts 12, the switch spring 14 and the switch post 16 are mounted in the housing base 4. Data contacts mounting holes 38, in which data contacts are inserted, are located in the front of the housing base 4, behind the shroud 8 and in the channel 30 formed at the rear of the housing base 4. The switch mounting hole 40 is located in the channel 30 to the rear of the switch post mounting hole 42, both of which are located on the side of the mounting holes 38 for the data contacts 12. The mounting posts 20 and the standoff posts are shown extending from the lower surface of the housing base 4 along the outer edges. The housing base 4 is molded using a straight pull mold without side pulls. Clearance holes 44 and grooves 46 extend through the rim 24 on opposite sides of the mounting posts 20 so that latching and camming surfaces by be formed adjacent to the lower ends of the mounting posts. These structures will be subsequently discussed in more detail. Six cover mounting holes 48 are located in the rim 24 along the sides and rear of the housing base 4. These holes 48 will receive cover mounting lugs to secure the cover 6 the base 4 as will be apparent during the subsequent discussion of the cover.

Figure 5:
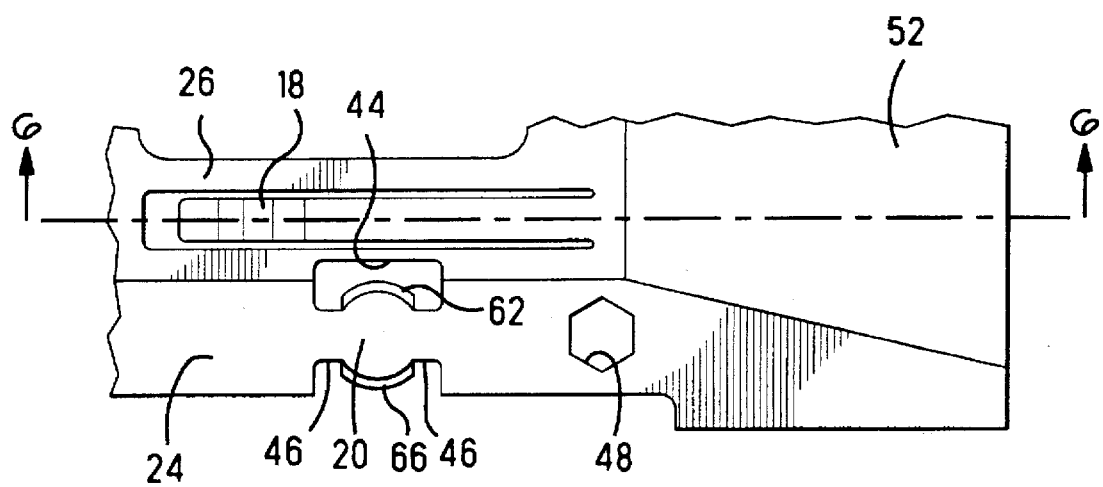
FIG. 5 is a fragmentary view of the housing base showing the position of the base diverter springs.
Figure 6:
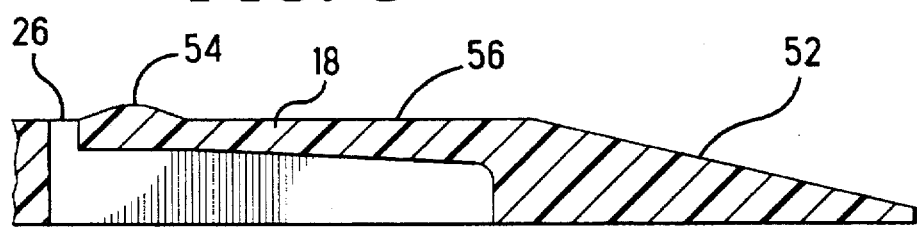
FIG. 6 is side section view of the housing base taken along section lines 6—6 in FIG. 5 showing the diverter springs.

FIGS. 5–8 are fragmentary views of different features on the housing base 4. FIG. 5 shows the portion of the plan view of the housing base 4 containing the diverter springs 18, the mounting posts 20 and the cover mounting holes 48. Each diverter spring 18 comprises a molded cantilever beam which is integral with the base 4. Two slots on either side of the diverter spring 18 join a top slot to define the diverter spring. This cantilever beam is formed during molding of the base by blades or walls which form the slots. As can best be seen in the side sectional view of FIG. 6 each diverter spring 18 has a raised semi cylindrical boss 54 adjacent its free end and spaced from the base portion 56 of the cantilever diverter spring 18. This boss 54 normally extends above the upper surface 26 of the housing base 4 in the card slot area 10. When a card is inserted into the card slot 10, the card engages the boss 54 and the diverter 18 is forced downward while the card is urged upward toward the top of the slot 10. This action serves several purposes. First it tends to provide a controlled lead in for the card slot and prevents the card from snagging on any irregular surface on the housing base. Second by urging the card upward, less force is exerted against the resilient data contacts 12, especially during relative movement between the card and the data contacts 12, thus tending to prolong the life of the data contacts 12. Engagement of the diverter spring 18 with the card also produces a frictional force which tends to prevent movement of the card back out of the slot and tends to resist the force exerted by the end position spring 14.

Figure 7:
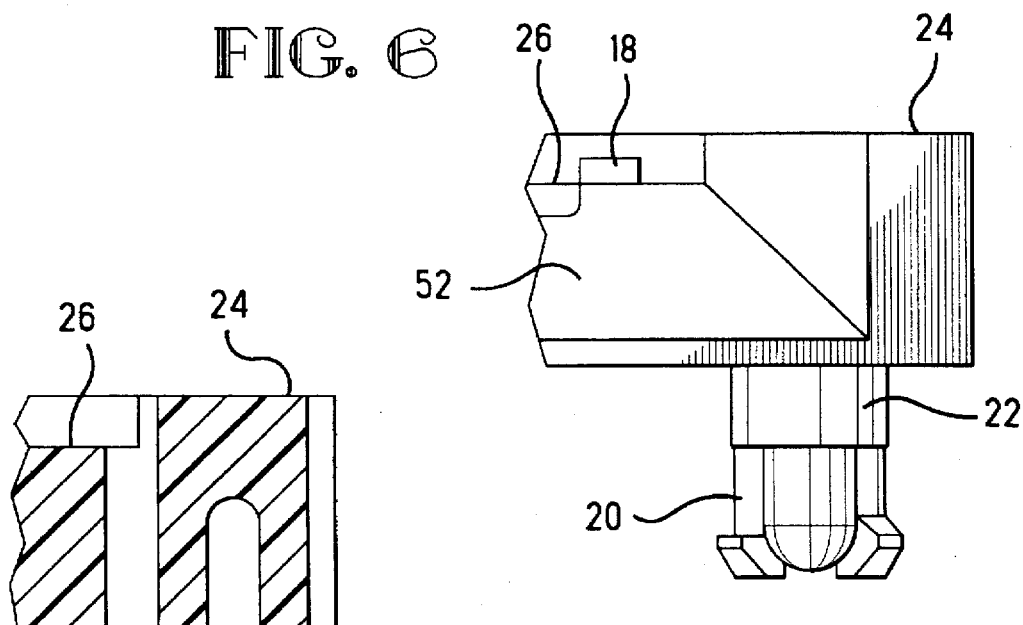
FIG. 7 is a fragmentary side view of the housing base showing the mounting posts.
Figure 8:
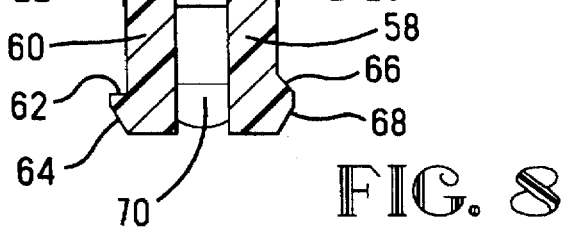
FIG. 8 is a side sectional view of the housing base showing the mounting posts.

FIG. 5 also shows the configuration of the clearances 44 and 46 and upwardly facing surfaces 62 and 66 on the mounting posts 20 which are formed by molding pins extending through these clearance openings. FIGS. 7 and 8 show more detail of the mounting posts 20. Each mounting posts comprises two separate legs extending form the lower surface of the housing base 4. These two legs are formed by a slot 70 extending between the lower surface of the base 4 and the free ends of the mounting posts 20. Each of the mounting post legs is flexible. A mounting post latching leg 60 is located on the interior side of slot 70 while a mounting post cinching leg 58 is located adjacent the exterior side of the housing base 4. As can be best seen in FIG. 8, each of the legs has an enlarged section adjacent its distal end. The latching mounting post leg 60 has a downwardly facing beveled or inclined surface 64 and an upwardly facing latching surface 62 which extends perpendicular to the axis of the mounting post leg 60. When the housing base 4 is inserted downwardly into a mounting hole in a printed circuit board, the beveled surface 64 causes leg 60 to resiliently cam inwardly to permit entry of the leg 60 into the mounting hole. Once fully inserted, the latching surface 62 will engage the lower surface of the printed circuit board to prevent upward extraction of the housing base 4 and the smart card connector 2. Only an intentionally applied lateral force on mounting post leg 60 will disengage the latching surface 62 from the printed circuit board. The other mounting leg 58 also has a downwardly facing beveled surface 68 which again cams this leg inwardly to permit insertion of the mounting post 20 into a mounting hole. However, cinching leg 58 has an upwardly facing beveled surface 66. This upwardly facing beveled or inclined surface 66 does not latch against the bottom of a printed circuit board in the same manner as latching surface 62. Instead this beveled surface engages the printed circuit board along the edge of the post mounting hole and pulls the housing base 4, and the smart connector 20 towards the printed circuit board on which it is mounted if the thickness of the printed circuit board is less than its nominal dimension. The connector 2 will then fit snugly against the printed circuit board helping to insure that the smart connector is properly portioned on the printed circuit board. Alternatively, the upwardly facing beveled surface 66 will provide a greater range of engagement with printed circuit boards having a thickness greater than its nominal dimension. For these thicker printed circuit boards, the latching surface 62 on mounting post leg 60 may not fully deploy because it remains within the confines of the printed circuit board hole. This is of course true for conventional mounting posts which employ only a perpendicular latching surface. The upwardly facing beveled surface 66 will however partially engage the lower surface or the printed circuit board, or at least the edge of the printed circuit board, to provide some latching engagement. This beveled surface will help take up any tolerances in the printed circuit board and the housing base 4 to insure a tight rather than a lose fit. Latching is still maintained by the perpendicular surface 62 on the other leg 60 on most printed circuit boards.

Figure 9:
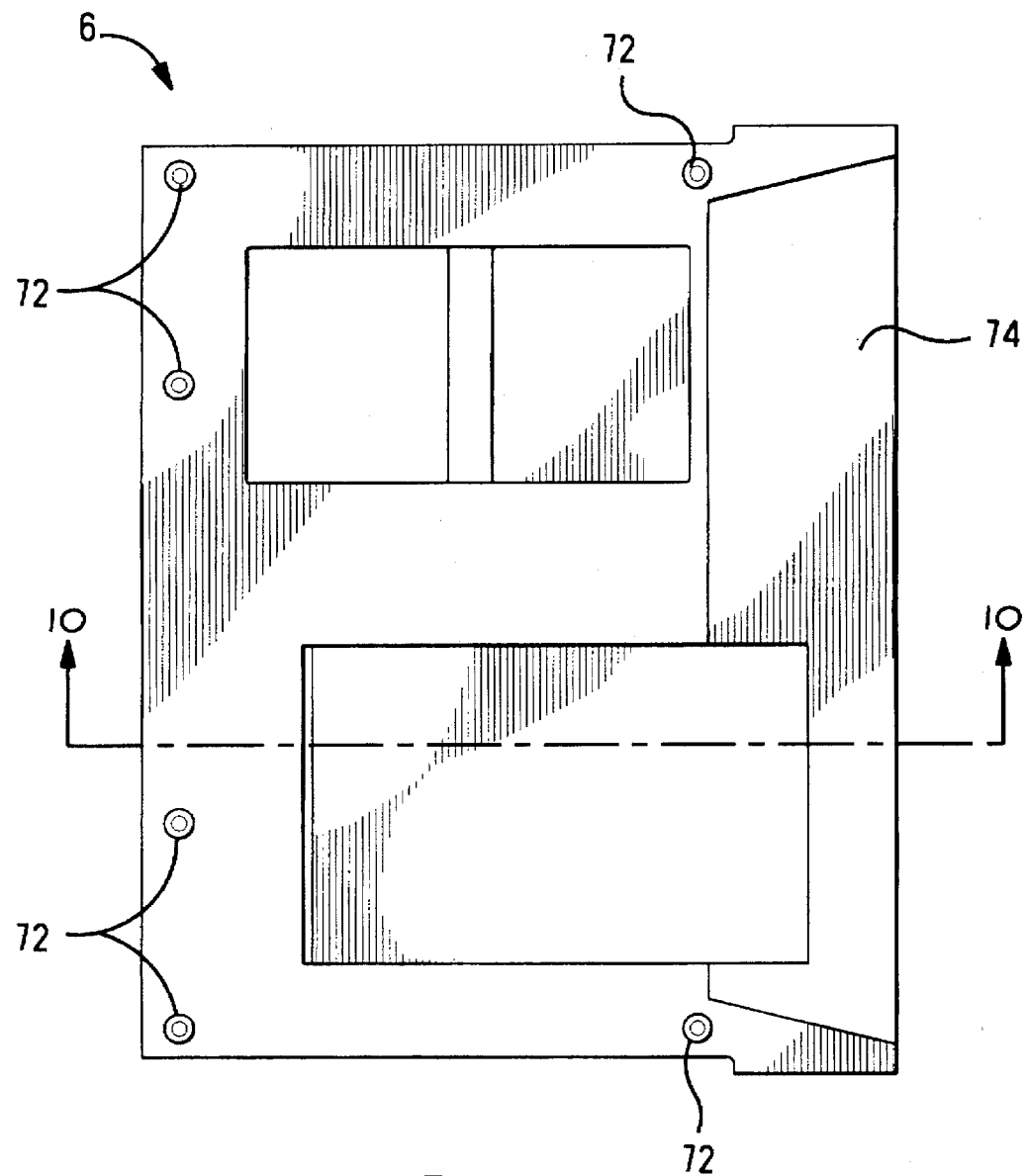
FIG. 9 is a view of the bottom of the housing cover.
Figure 10:
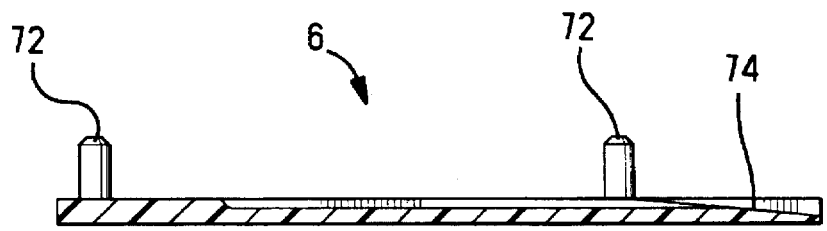
FIG. 10 is a section view of the housing cover taken along section line 10—10 in FIG. 9.
Figure 11:
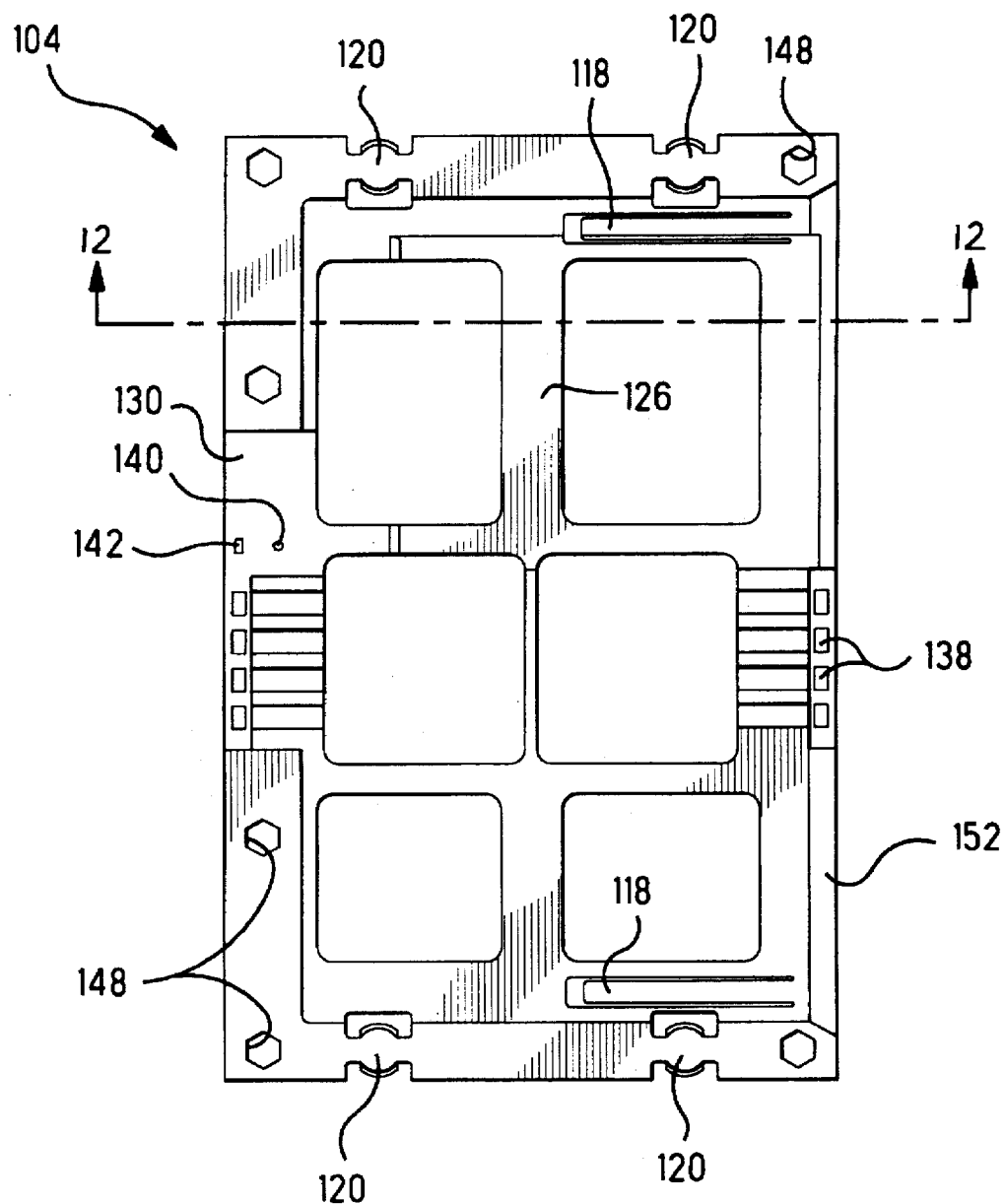
FIG. 11 is a top plan view of a second embodiment of a smart connector housing base which does not include a front shroud.
Figure 12:
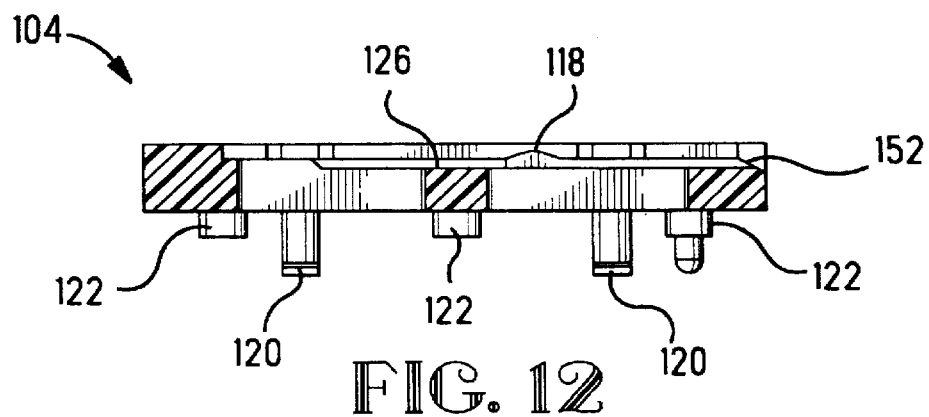
FIG. 12 is a side sectional view of the housing base shown in FIG. 11.
Figure 13:
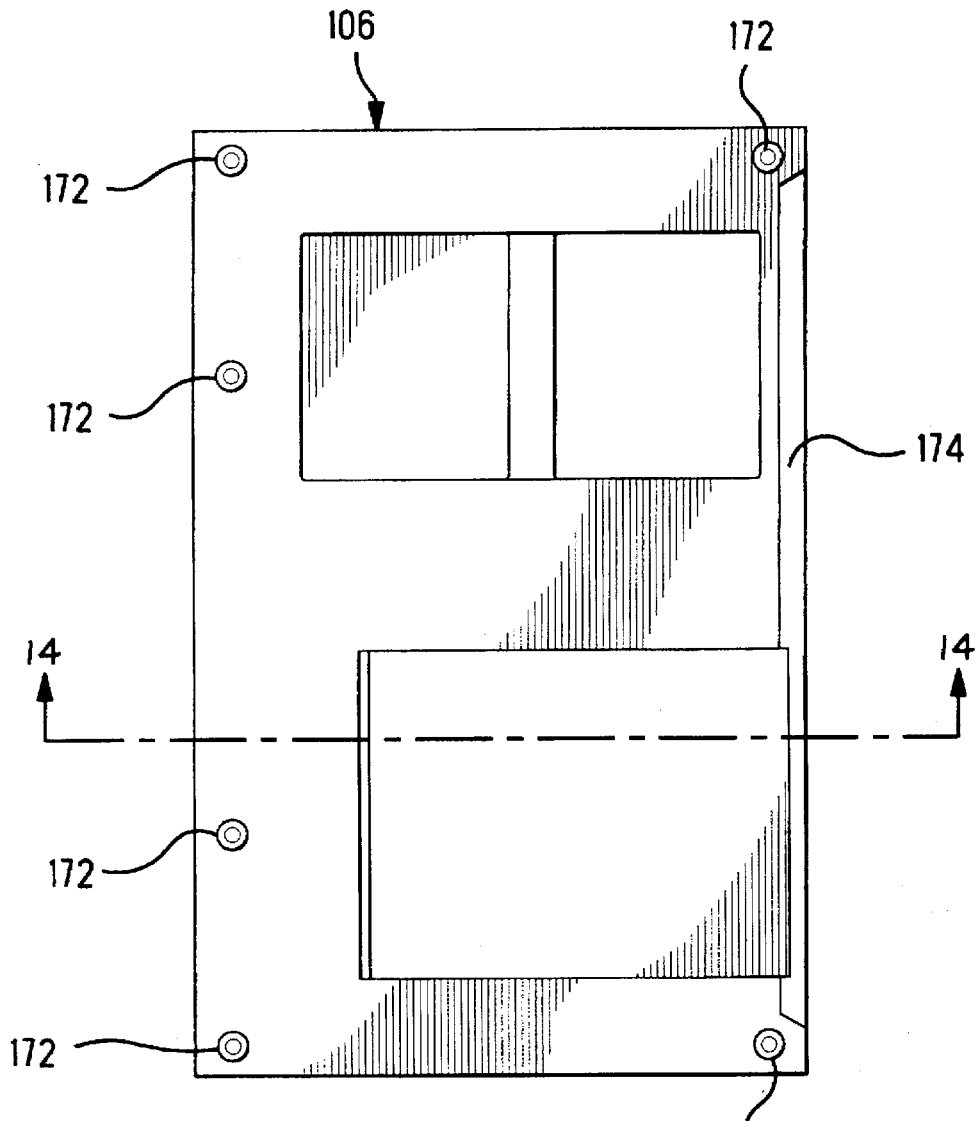
FIG. 13 is a bottom view of a housing cover which is used with the embodiment of the housing base shown in FIGS. 11 and 12.
Figure 14:
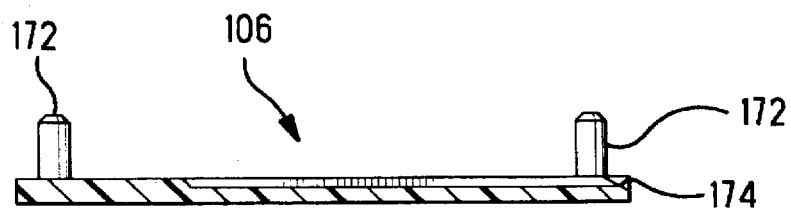
FIG. 14 is a side sectional view of the housing cover shown in FIG. 13.
Figure 19:
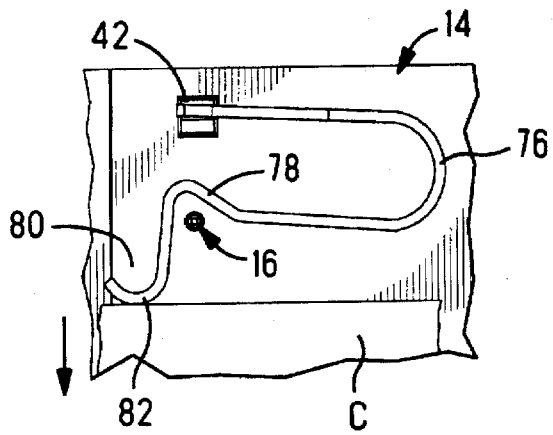
FIG. 19 is a top plan view of the end position switch in its open position with the card fully inserted.

The housing of this embodiment of the smart connector is a two piece member consisting of the housing base 4 and a housing cover 6 which is attached to the base. The cover 6 is shown in FIGS. 9 and 10. Cover 6 is a substantially flat molded member formed of the same material as the base 4. A downwardly facing inclined surface 74 is located on the front of the cover 6 and together with opposed inclined surface 52 on the base 4, forms the inclined entry scoop or shroud 8. The cover also has six downwardly extending lugs 72 molded into the bottom surface of the cover 6. These lugs 72 are positioned for insertion into lug mounting holes 48 on the housing base 4. The cover 6 can the be attached simply by inserting the lugs 72 into holes 48. Any number of conventional techniques can be used to secure the lugs 72 in holes 48. The lugs and holes can be dimensioned for an interference or press fit. Alternatively the lugs 72 can be ultrasonically bonded in the holes 48 or they can be heat staked. The lugs can also be provided with latching surfaces to secure the cover 6 to the base 4. Alternatively the cover 6 could be secured to the base by using latches which engage the opposite member around the periphery.

FIGS. 11–14 show alternate embodiments of a housing base 104 and cover 106 which does not include a lead in shroud or scoop. This alternate embodiment is otherwise the same as the embodiment of FIGS. 1–10. Similar reference numbers have been used to identify corresponding components in both embodiments, with the components of the second embodiment being identified by a 100 series of numerals. For example the mounting posts are referred to using the numeral 120 in the second embodiment, and the second embodiment diverter springs are referred to by the numeral 118. This unshrouded embodiment could be used in applications in which the lead in is not necessary. For example, this embodiment could be mounted on a chassis which included a lead in as part of the chassis. A third embodiment, similar to the second embodiment would include a separate attachable shroud which could be mounted at the front of the housing base 104 and cover 106 so that the same base and cover components could be used in either a shrouded or an unshrouded configuration.

The data contacts 12, the switch spring 14 and the switch post 16 can be used with any of the embodiments of the housing base and cover. FIG. 15 shows a top plan view of the switch spring 14 and the switch post 16 which together form the normally closed end position switch used in this smart connector. The switch spring 14 comprises a stamped and formed member which is fabricated from a conventional spring metal. The spring is formed in a U-shaped configuration formed by two arms and a connecting bight which together form the deflectable spring section 76. The forward portion of this deflectable spring section joins a wiping contact section 78 which is formed toward the rear portion of the spring about an angle $A_1$ of approximately one hundred sixty degrees. This contact or wiping section 78 joins a forward extension 80 which is formed at an angle $A_2$ of approximately sixty five degrees. This forward extension 80 extends into the card slot 10 when mounted on the housing base 4. A card engaging tab 82 is formed on the end of the forward extension 80 to provide a card engagement surface. When positioned in the housing base 4, the tab 82 would normally be in the card slot 10.

The post 16 can be any of a number of simple contact pins. In the preferred embodiment, this post 16 is in the form of a brass wire, having a outer diameter of approximately 0.0169 inch, which can be plated with a noble metal in the contact area and can have a tin lead plating at the end to be soldered in a printed circuit board. A interference retention area can be stamped in this post to provide an interference fit of the wire post 16 in the post mounting hole 42 in the channel 30 of the housing base 4. Alternatively this post could be formed using a conventional square post configuration.

Figure 20:
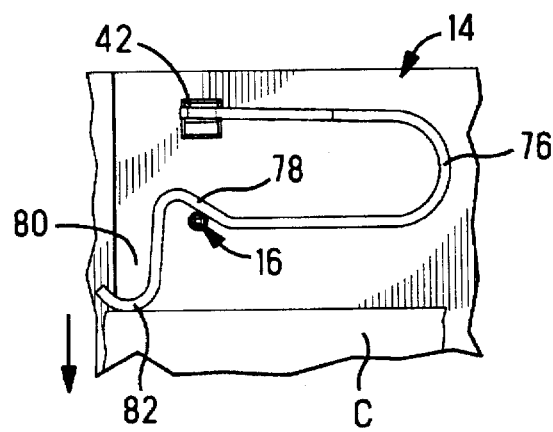
FIG. 20 is a top plan view similar to FIG. 19 with the card partially removed.
Figure 21:
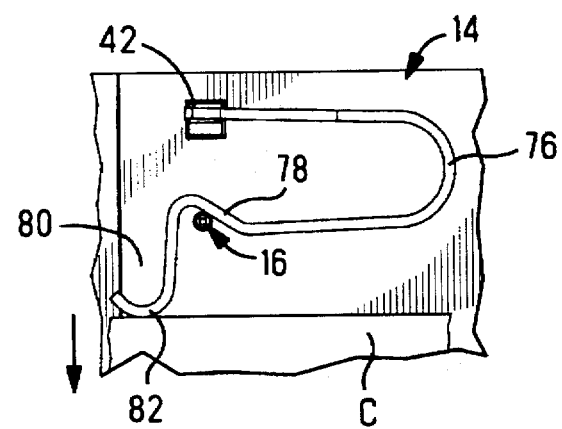
FIG. 21 is a view similar to that of FIG. 20 with the card further removed.
Figure 22:
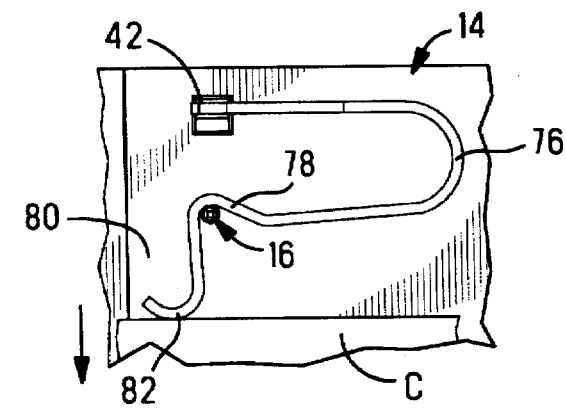
FIG. 22 is a view of the end position switch in its closed position and the card about to be fully withdrawn from engagement with the switch.

The engagement between the post 16 and the spring 14 can best be seen in FIGS. 15 and 19 to 22, which show the sequential movement of the spring 14 relative to post 16 as a card C is withdrawn from the card slot 10. In the normally closed position of the switch, the post 16 engages the spring 14 along the wiping section 78 proximate the end where the wiping section joins forward extension 80. When a card C is inserted into slot 10, it engages the tab 82, the spring 14 is deflected rearwardly and pivoted at an angle to approximately the position shown in FIG. 19 and represented by the phantom lines in FIG. 15. In this open position the spring 14 is no longer in engagement with the post 16. Total travel between the closed and the open positions can be on the order of 0.030 inch. Opening the switch would be interpreted by the smart card reader as indicating that a card had been inserted into card slot 10 and is in engagement with the rear card stop shoulder 28. At this point the diverter springs 18 would engage the lower surface of the card and would provide a reactive force against the restoring force of the spring 14. When the card is removed the restoring force in the deflected U-shaped spring section 76 will return the switch to its normally closed position, shown in FIGS. 15 and 22. Since the wiping contact section 78 is angled relative to the spring section 76 and engages the post 16 in an inclined tangential direction, the wiping contact section 78 slides along the post creating a wiping action between the spring 14 and the post 16, as best seen in FIGS. 20 and 21. As can be seen in FIG. 20, the wiping section 78 first engages post 16 at a location proximate the end of the U-shaped section. As the spring 14 moves further to the closed position, as shown in FIGS. 21 and 22, the wiping section slides along post 16 to a second location closer to the opposite end and adjacent the extension 80. This wiping action removes contaminates from the engaged surfaces of the spring 14 and post 16 and insures reliability of the electrical connection therebetween. The U-shaped spring is the only resilient member and this spring occupies less space than the conventional dual resilient members normally used in end position switches.

FIG. 16 shows the mounting leg 84 located on the spring at the end of the deflectable section 76 opposite from the wiping contact section. This mounting leg extends generally perpendicular to the other spring sections and includes anchoring section having barbs 86. When the mounting leg 84 is inserted into spring mounting hole 40 in the housing base 4, these anchoring barbs engage the housing base to secure one end of the spring in the base. The distal end of the leg 84, which includes a tin lead plating, forms a solder tail which extends below the bottom surface of housing base 4 where it can be soldered into a plated through hole in a printed circuit board.

FIGS. 17 and 18 show the data contacts 12. These contacts are substantially conventional resilient contacts which include a contact arm 88 with a contact point located adjacent its distal end. The opposite end of the data contact 12 is bent at a right angle to form an anchoring leg and solder tail section 90. Anchoring barbs 92 are formed adjacent the right angle bend so that the data contacts 12 can be press fit into the contact mounting holes 38 at the front and the rear of the housing base 4.

The representative embodiment of the smart connector depicted herein does not constitute the only embodiment of a device employing the invention as disclosed and claimed herein. A smart connector using a normally open end position switch could use the same basic spring and post configuration. The switch spring could also be modified so that the smart card engaged the spring at a location other than on its distal end. The stationary post employed with this invention need not comprise a wire as depicted herein, and the spring and the post need not be mounted directly to the housing base. These and other modifications would be apparent to one of ordinary skill in the art and would not depart from the scope of claims included herein.

We claim:

1. A connector for use with a smart card, the connector comprising:

a housing having a front and a rear and including a base and a cover, the base and the cover defining a card slot between the base and the cover, the card slot being open at the front of the housing, the card slot extending into the housing toward the rear of the housing;

a plurality of contacts positioned in the base and extending into the slot for engagement with corresponding contacts of the smart card upon insertion of the smart card into the card slot;

a switch located at the rear of the card slot, the switch being activated when a smart card, fully inserted into the card slot, engages the switch, the switch comprising a stationary post and a spring member including a U-shaped deflectable section and a wiping section extending at an angle from an end of the deflectable section;

the spring member being formed through an obtuse angle at the other end of the U-shaped section toward a location at which the spring member is mounted to the housing, the spring member being then formed through an acute angle so that a distal end of the spring member extends away from the location at which the spring member is mounted to the housing, the switch post being located between the obtuse angle and the acute angle on a side of the spring member, the post being located adjacent to the wiping section and in engagement with the wiping section when the spring member is in a closed position, the wiping section sliding along one side of the post as the spring member moves from an open position to a closed position with the post;

the deflectable section being positioned for engagement with a smart card as the card is inserted into the card slot;

both the spring member and the post being mounted in the base and having contact sections for connection to circuitry on a printed circuit board when the connector is mounted on the printed circuit board, and the spring member and post are connected to a circuit for determining when a card is present in the connector, wherein the spring member is in the open position when the card is fully inserted into the card slot and wherein the spring member is in the closed position when the card is removed from the card slot.

2. The connector of claim 1 wherein insertion of a smart card fully into the card slot deflects the spring member toward the rear of the housing.

3. The connector of claim 1 wherein the spring includes a leg at one end, the leg including a board contact section at a distal end of the spring and an anchoring section between the board contact section and the deflectable section.

4. The connector of claim 3 wherein the anchoring section is positioned in a hole in the housing base, the anchoring section fixedly securing the leg to the base, with the board contact section positioned on the exterior of the housing for engagement with a printed circuit board on which the connector is mounted.

5. The connector of claim 4 wherein the post is positioned in the base with the distal end being positioned on the exterior of the housing for engagement with a printed circuit board, the post and the leg being side by side.

6. The connector of claim 5 wherein a card engagement member, located on the distal end of the deflectable section, extends into the card slot toward the front of the housing.

7. The connector of claim 1 wherein the card slot includes a stop shoulder, the end of the deflectable spring extending into the card slot past the stop shoulder prior to insertion of a smart card into the card slot, the smart card engaging the stop shoulder upon full insertion of the smart card into the card slot.

8. The connector of claim 1 wherein the wiping section extends at an acute angle relative to the direction in which the smart card is inserted into the card slot and the post is orthogonally mounted relative to the smart card slot so that while the spring member is moving to its closed position, the wiping section moves tangentially to the post to create a wiping action between the spring member and the post.

9. The connector of claim 1 wherein the switch spring member is stamped and formed from a flat blank of spring metal and the switch post comprises a wire mounted in the housing base.

10. The connector of claim 1 wherein the switch spring member is stamped and formed with a mounting leg extending transverse to the plane in which the spring member moves when deflected.

11. The connector of claim 1 wherein the contacts are data contacts, at least some of the data contacts being mounted at the rear of the housing base, and the switch spring member and the switch post are mounted in the rear of the housing base adjacent the rear data contacts.

12. The connector of claim 11 wherein some of the data contacts, the switch spring member, and the switch post are all mounted in a channel at the rear of the housing base, the channel communicating with the card slot.

* * * * *